United States Patent

Rutz et al.

[11] Patent Number: 5,537,726
[45] Date of Patent: Jul. 23, 1996

[54] LONGITUDINAL FILM STRETCHER ESPECIALLY FOR THERMOPLASTIC FILM

[75] Inventors: Andreas Rutz, Lindau; Adolf Mueller, Weissensberg, both of Germany

[73] Assignee: Lindauer Dornier Gesellschaft mbH, Lindau, Germany

[21] Appl. No.: 421,368

[22] Filed: Apr. 12, 1995

[30] Foreign Application Priority Data

Apr. 15, 1994 [DE] Germany ............................ 44 13 162.3

[51] Int. Cl.$^6$ .................................................. D06C 3/06
[52] U.S. Cl. ...................................... 26/99; 26/87
[58] Field of Search ......................... 26/99, 51, 71, 26/87, 88, 97, 99, 100, 101; 264/288.4, 291

[56] References Cited

U.S. PATENT DOCUMENTS

| 1,019,615 | 3/1912 | Dunn | 26/99 |
| 3,201,826 | 8/1965 | Brückner | 26/97 |
| 3,755,861 | 9/1973 | Castro et al. | 26/71 |
| 4,726,293 | 2/1988 | Ende | 26/99 |

FOREIGN PATENT DOCUMENTS

| 2635585 | 2/1978 | Germany . | |
| 0259315 | 8/1988 | Germany | 26/99 |
| 456933 | 7/1968 | Switzerland . | |
| 967127 | 8/1964 | United Kingdom . | |

*Primary Examiner*—Amy B. Vanatta
*Attorney, Agent, or Firm*—W. G. Fasse; W. F. Fasse

[57] ABSTRACT

A film or web stretcher particularly for thermoplastic film has a plurality of stretching cylinders, at least one or more of which cooperate with a press-on roller particularly at the inlet and/or outlet of the stretcher. A mounting arm (6) at each end of the stretcher cylinder permits the mounting of the press-on roller in such a way that the latter can be tilted through a limited angular range about the rotational axis of the stretching cylinder by a first drive. A second drive, such as a piston cylinder device adjusts the press-on roller relative to the stretching cylinder to thereby apply a press-on force. The first drive may, for example, be accomplished by a manually driven device for positioning the press-on roller and its cooperating components in any one of two end positions and in any position between the two end positions. The press-on roller may be directly mounted to the mounting arms (6) or through support brackets (9) to the arms (6).

10 Claims, 4 Drawing Sheets

LONGITUDINAL FILM STRETCHER ESPECIALLY FOR THERMOPLASTIC FILM

FIELD OF THE INVENTION

The invention relates to an apparatus for stretching a travelling film or web, especially a thermoplastic film in its longitudinal direction. Such film stretching machines, herein simply referred to as stretcher, comprise at least one press-on roller in addition to a plurality of draw or stretching cylinders. The press-on roller is preferably arranged at the inlet end of the stretcher.

BACKGROUND INFORMATION

British Patent 967,127 (Nash), published on Aug. 19, 1964, discloses a film or web stretcher with a plurality of stretching cylinders arranged at different levels in a machine frame and cooperating with at least two press-on rollers. The press-on rollers are mounted on one end of a bellcrank, the other end of which is connected to a respective piston cylinder device, whereby the respective press-on roller can be tilted toward and away from the corresponding stretching cylinder. In such an arrangement the press-on force has, in addition to the desirable radial component, a substantial tangential component which is less desirable.

It is the purpose of the press-on roller or rollers to assure a bubble-free contact of the web or film with the respective stretching cylinder. Another purpose of the press-on roller or rollers is to increase the stretching forces that can be effectively introduced into the film or web being stretched. Still another purpose of the press-on roller or rollers is to avoid the formation of undulating longitudinal film or web edges. In other words, the cooperation of the stretching cylinder with the press-on roller shall make sure that the width of the stretched film or web is uniform through the length of the film or web.

The art leaves room for improvement, especially with regard to the above listed several different purposes of the press-on roller or rollers.

OBJECTS OF THE INVENTION

In view of the above it is the aim of the invention to achieve the following objects singly or in combination:

to avoid the inclusion of bubbles between the film or web being stretched and the surface of the stretching cylinder, especially at the inlet end of the film stretcher;

to provide an effective positioning and position control for the positioning of the press-on roller relative to the corresponding stretching cylinder so that an optimal line of contact is assured between the stretching cylinder and the respective press-on roller to thereby increase the radially effective press-on force component while reducing a tangential force component of the press-on force;

to assure that the width of the stretched web or film remains constant along its entire length by avoiding undulating edges; and to permit selecting the position of the press-on roller relative to its stretching cylinder depending on the particular task to be performed by the press-on roller such as bubble avoidance.

SUMMARY OF THE INVENTION

The film or web stretcher according to the invention is characterized in that a plurality of film stretching cylinders are rotatably mounted in a machine frame wherein at least one press-on roller is mounted for cooperation with one of the stretching cylinders, preferably the lead-in stretching roller and/or the feed-out stretching roller. A pair of mounting arms mount the press-on roller for tilting or revolving about a rotational axis of said one or respective stretching cylinder so that a longitudinal axis of the press-on roller and the rotational axis of the respective stretching cylinder extend in parallel to each other in any position of the press-on roller and the respective stretching cylinder relative to each other. The mounting arms have a mounted end which is rotatably secured for rotation about the rotational axis of the respective stretching cylinder. A first drive is provided for rotating the mounting arms about the rotational axis of the stretching roller to cause the revolving or tilting of the respective press-on roller about the rotational axis of the corresponding stretching cylinder. A second drive is provided for causing the press-on roller to move toward or away from the respective stretching cylinder for controlling the press-on force. It has been found according to the invention that the effectiveness of the above mentioned several functions of the press-on roller depends substantially on the relative position between the cooperating press-on roller and stretching cylinder. For example, bubbles are best avoided if the press-on roller is positioned as close to the inlet or entrance of the film or web into the stretcher. On the other hand, the formation of undulating web edges is best avoided by positioning the press-on roller as close as possible to the exit of the stretcher. Thus, in a preferred embodiment a press-on roller is provided at the inlet end and at the exit end and both rollers are mounted as taught herein for tilting or revolving through a limited angular range around the rotational axis of the respective stretching cylinder. Optimal stretching forces are uniformly introduced into the film or web if the press-on roller contacts the stretching cylinder along a line that is approximately dividing the looping angle of the film or web around the stretching cylinder.

By the use of two tiltable mounting arms for mounting the press-on roller it is possible to tilt the press-on roller through a limited angular range about the rotational axis of the stretching cylinder. In one preferred embodiment the press-on roller is mounted on a shaft which in turn is directly and rotatably mounted in the pair of mounting arms that are tiltable by the first drive. The bearings that mount the press-on roller shaft directly to the mounting arms are displaceable by a second drive in the radial direction of the stretching cylinder to apply the press-on force, whereby the desirable radial press-on force component is maximized.

In another preferred embodiment the press-on roller is rotatably held by two brackets. One end of each bracket is operatively connected to the respective mounting arm. The other end of at least one, preferably both brackets is pivoted to the second drive for controlling the press-on force.

The drive for the angular tilting of the press-on roller is the same in both instances. Similarly, the limited angular tilting range of about 80° to 120° is controlled in both instances by the same stop or arresting mechanism.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
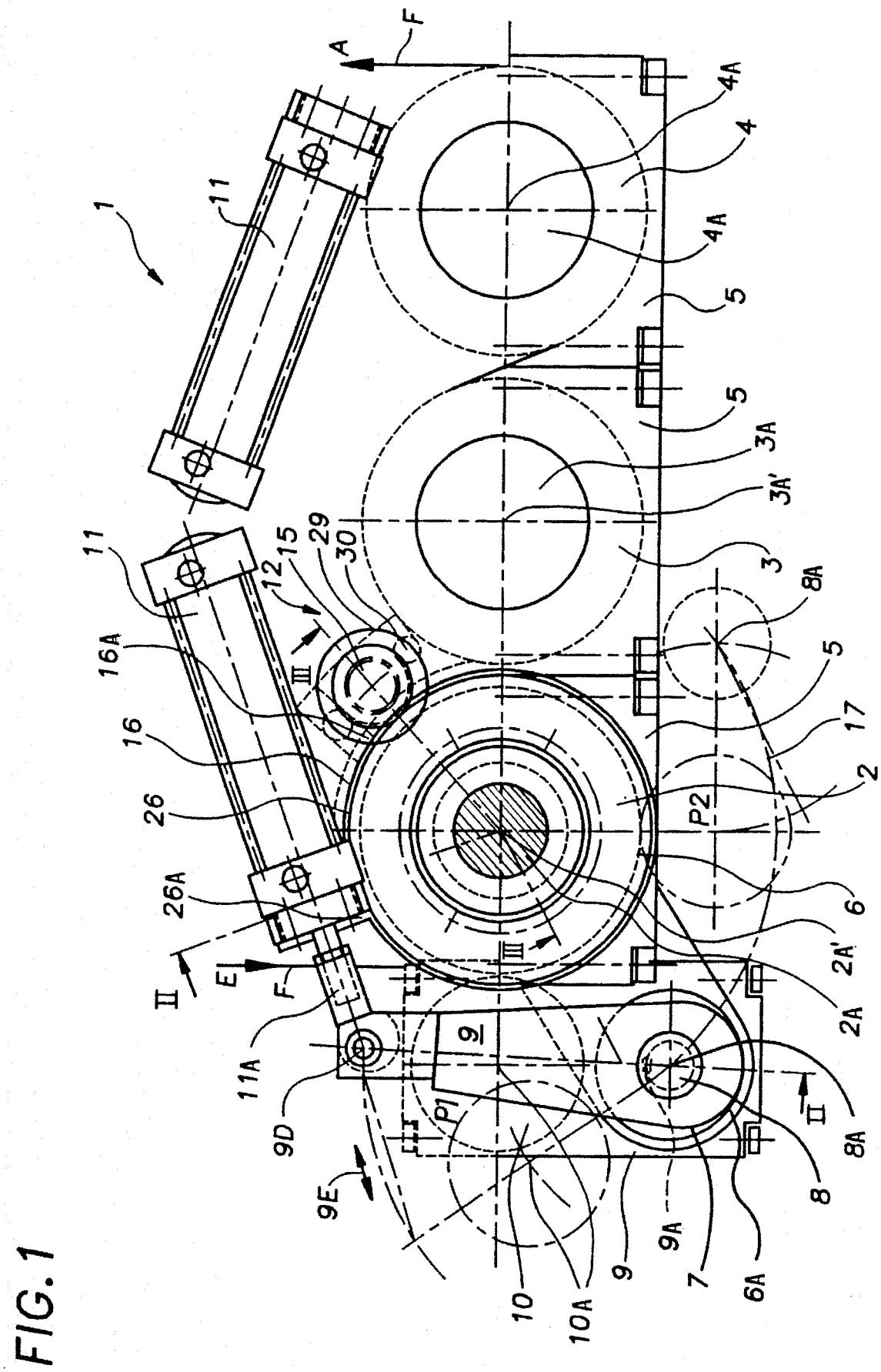
FIG. 1 is a schematic side view of a first embodiment of the film stretcher according to the invention showing the press-on roller supported by two brackets secured to two mounting arms in a first end position at the inlet end of the stretcher.
Figure 2:
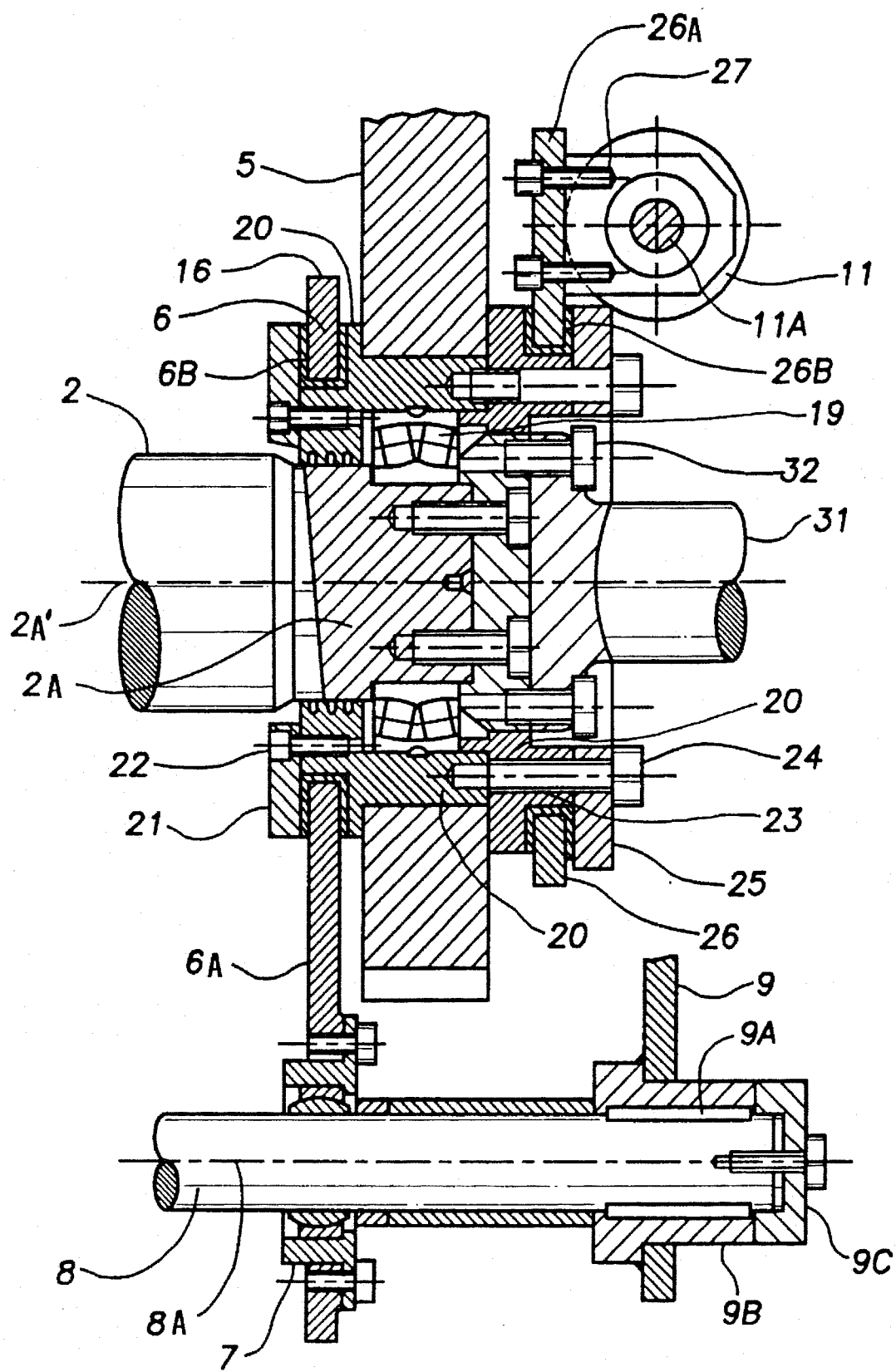
FIG. 2 is a sectional view along section line II—II in FIG. 1, illustrating the tiltability of the two mounting arms holding the brackets that support the press-on roller.
Figure 4:
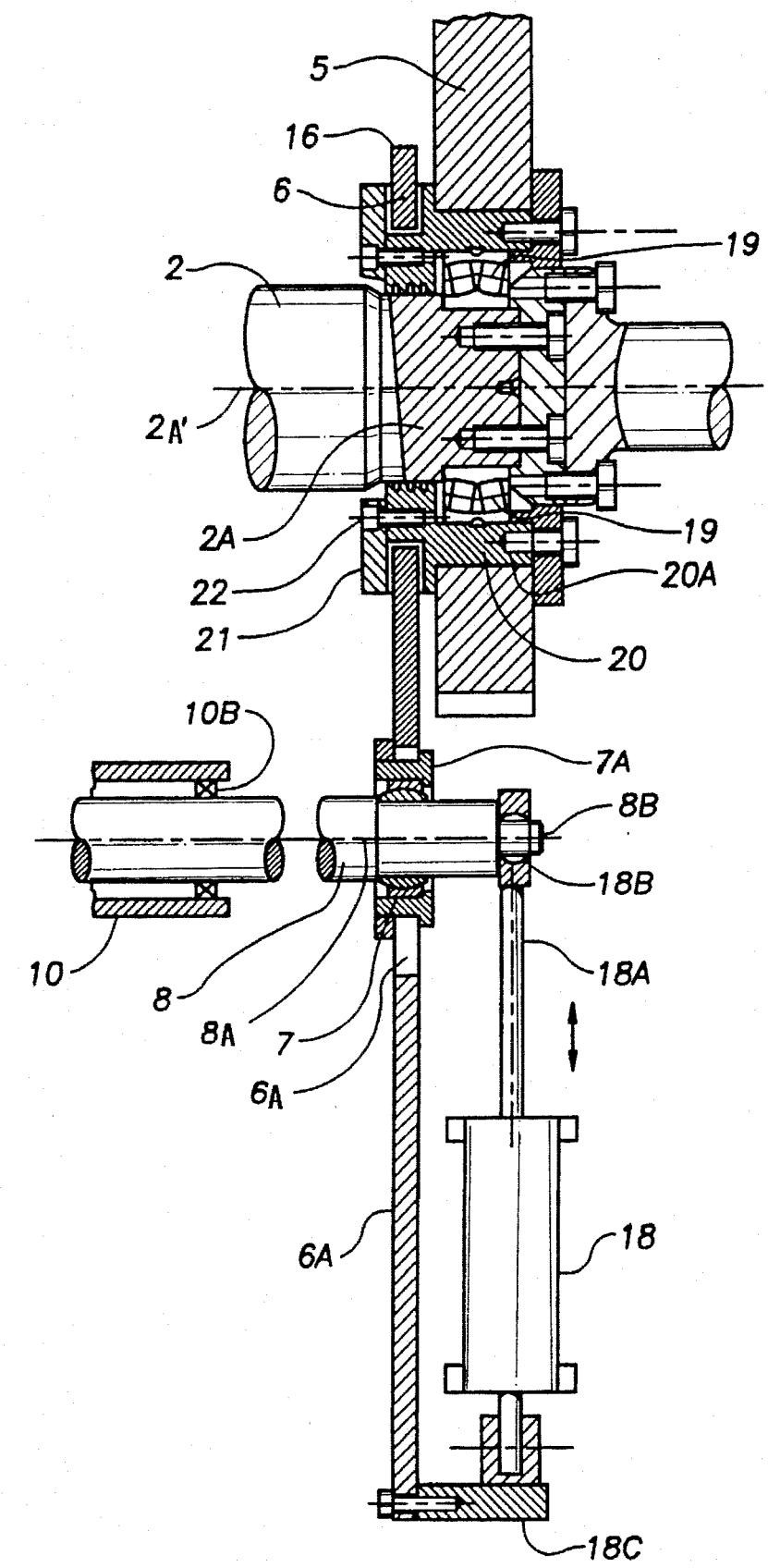
FIG. 4 shows a sectional view through a second embodiment in which the press-on roller is rotatably mounted directly in the mounting arms for a radial displacement by the second drive thereby avoiding the support brackets.

FIG. 1 shows the present stretcher 1 schematically. The basic construction is the same for both embodiments. The sectional views shown in FIGS. 2 and 4 show structures that are provided at each end of the respective press-on rollers and stretching cylinders, namely on each side of the stretcher. These structures are of mirror-symmetrical construction relative to each other. Therefore, only one structure is shown. Mounting plates 5, only one of which is shown, form the sides of the machine frame. Three stretching cylinders 2, 3, and 4 are rotatably mounted in the mounting plates 5 by cylinder stubs 2A, 3A and 4A held in respective bearings 19 as will be described in more detail below. A film or web F travels into an entrance E of the stretcher and leaves the stretcher at an exit A.

Each cylinder stub 2A carries at its respective free end a tiltably supported mounting arm 6 providing a one-armed lever 6A for the direct or indirect mounting of a respective press-on roller 10 as will be described in more detail below. Each mounting arm 6 is held in a slide bearing 6B to permit its rotation around the rotational axis 2A' of the stretcher cylinder 2. The rotation of both mounting arms 6 in unison permits the tilting or revolving of the press-on roller 10 about the rotational axis 2A', whereby the longitudinal axis 8A of a connecting shaft 8 remains in parallel to the rotational axis 2A' at all times.

In the first embodiment shown in FIGS. 1 and 2 the free end of the lever arm 6A carries a bearing 7 in which the just mentioned connecting shaft 8 is rotatably mounted. Each end of the shaft 8 is rotatably mounted as seen in FIG. 2 and a portion of the shaft end projects axially outside the respective lever arm 6A for connection to a respective support bracket 9 to be described below. The shaft 8 extends thus over the entire width, or rather working length of the stretching cylinder 2. Each support bracket 9 is secured to the respective free end of the shaft 8, either rigidly as shown by the tongue and groove connection 9A illustrated in FIG. 2, or in a relative rotating manner. The support bracket 9 is secured, for example, by welding to a mounting bushing 9B which is in turn held in place in an axial direction by a cup and screw 9C. The two support brackets 9 together form a support bracket pair. One end of each bracket of the bracket pair is preferably rigidly secured to the respective shaft end of shaft 8 as mentioned, while the other end of each bracket pair is pivotally connected at 9D to the free end of a piston rod 11A of a piston cylinder device 11 shown in FIG. 1 forming the above mentioned second drive for the control of the press-on force. Thus, motion of the piston rod 11A rotates or tilts the brackets 9 about the rotational axis 8A of the shaft 8 as indicated by the angle 9E. The two piston cylinder devices 11, one at each end of the stretching roller 2, are operated in unison.

Each end of the press-on roller 10 is rotatably mounted at 10A to the respective bracket 9 intermediate the ends of the bracket 9. The mounting arms 6, the shaft 8, the brackets 9, the press-on roller 10, the piston cylinder devices 11, and mounting rings 26 for the piston cylinder devices 11 form a structural unit that is tiltable or revolvable in unison about the rotational axis 2A' of the stretching cylinder 2 as will be described in more detail below. The tilting angle is normally less than 100°, preferably 90° to permit the press-on roller 10 to assume two end positions P1 and P2 shown in FIG. 1. An arresting or stop device 29, 30 holds the above mentioned structural unit in the two end positions P1 and P2 and in any position between these end positions as will be described below.

Figure 3:
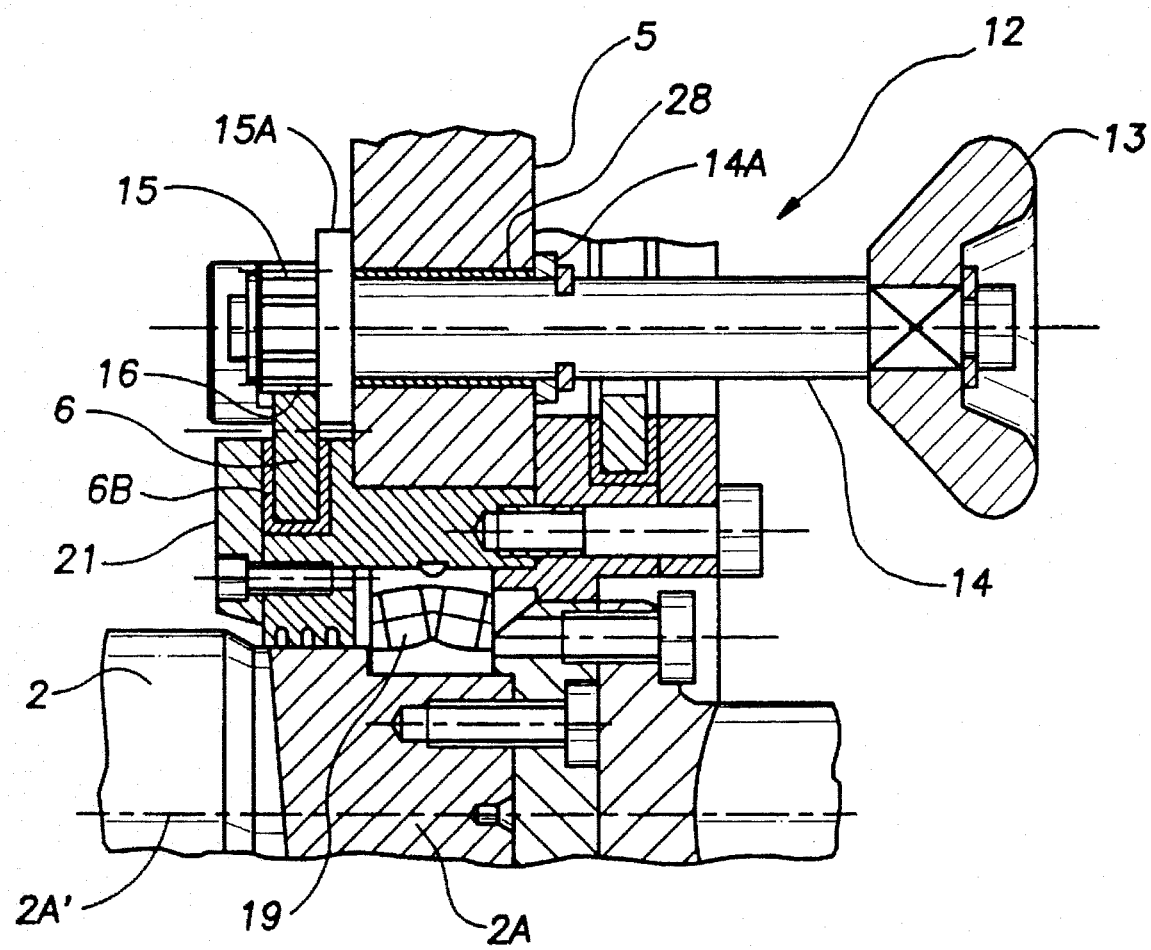
FIG. 3 is a sectional view along section line III—III in FIG. 1, illustrating the first drive for the tilting or revolving of the press-on rollers through a limited angular range relative to the respective stretching cylinder.

FIG. 3 shows a first drive for adjusting the above outlined structural unit between the positions 1 and 2 shown in FIG. 2 and any position in between. The first drive 12 comprises a drive shaft 14 rotatably mounted with a slide bearing 28 in the mounting plate 5 of the machine frame. A hand wheel 13 permits the rotation of the shaft 14. A locking device 14A such as a spring ring or the like prevents the axial displacement of the drive shaft 14 while permitting its rotation. A pinion 15 is rigidly mounted to the opposite end of the shaft 14. A spacer or washer 15A positions the pinion 15 in meshing engagement with a sector gear rim 16 of the mounting arm 6. The opening angle of the sector gear rim 16 corresponds to the desired adjustment range of about 80° to about 120°. Since the mounting arm 6 meshing with its gear rim 16 with the pinion 15 is rigidly connected with the mounting arm 6 through shaft 8 on the other side of the machine, it is sufficient to provide the angular adjustment drive 12 only one side of the stretcher 1. Rotation of the hand wheel 13 permits positioning the above described structural unit including the piston cylinder device 11 and the press-on roller 10 into any position between the end positions P1 and P2. Such revolving movement of the press-on roller 10 in its position away from the stretching cylinder 2 causes a point 10A on the rotational axis of the press-on roller 10 to move along the line 17 shown in FIG. 1.

FIG. 1 further shows a locking mechanism 29 with a locking screw 30 that can be screwed into the space between two neighboring teeth 16A of the gear rim 16 on the mounting arm 6. Thus, prior to an adjustment, the screw 30 is loosened and when the above mentioned structural unit is in the desired position, the screw 30 is tightened again.

FIG. 4 illustrates a second embodiment in which the use of the support brackets 9 is avoided by mounting the press-on roller 10 with bearings 10B directly on the shaft 8 on the one hand, and the shaft 8 with its bearing 7 in an adjustment bushing 7A which in turn is movable in a longitudinal guide hole 6C in the lever arm 6A of the mounting arms.

The second drive is provided by a piston cylinder unit 18 having a piston rod 18A pivoted at 18B to an end 8B of the shaft 8. The opposite end of the piston cylinder device 18 is mounted to the free end of the lever arm 6A as shown at 18C. Thus, if the piston rod 18A moves down in FIG. 4 to the extent permitted by the guide hole 6C, the press-on roller 10 is moved away from the stretcher cylinder 2. When the piston rod 18A moves upwardly, the press-on roller 10 is moved against the stretcher cylinder 2. The longitudinal orientation of the guide hole 6C and the longitudinal orientation of the piston rod 18A extend radially toward the rotational axis 2A' of the stretcher cylinder 2 with the advantage of maximizing the radial force component of the press-on force.

Referring further to FIG. 2, the end stub 2A of the stretcher cylinder 2 is mounted through the above mentioned bearing 19 in a mounting bushing 20 that is held in the mounting plate 5 by a clamping ring 25, an intermediate bushing 23 of rotational symmetry and screws 24 passing through the clamping ring 25, through the intermediate bushing 23 into the mounting bushing 20. A mounting ring 26 with an extension 26A carries the piston cylinder device 11 screwed to the extension 26A by screws 27. A slide bearing 26B is inserted between the intermediate bushing 23 and the clamping ring 25 so that the mounting ring 26 can rotate about the axis 2A' together with the above mentioned structural unit. Similarly, the slide bearing 6B permits the rotation of the mounting arm 6. The slide bearing 6B is held in place by a cover plate 21 mounted with screws 22 reaching into the mounting bushing 20. A drive shaft 31 connected to a drive gear and motor not shown, is secured by screws 32 to the end stub 2A of the stretcher cylinder 2 for positively driving the stretcher cylinder 2. A conventional gear would normally be provided between the drive shaft 31 and the respective motor.

Although the invention has been described with reference to specific example embodiments, it will be appreciated that it is intended to cover all modifications and equivalents within the scope of the appended claims.

What is claimed is:

1. A longitudinal film stretcher, comprising a machine frame (5), a plurality of film stretching cylinders (2, 3, 4) rotatably mounted in said machine frame, at least one press-on roller (10) mounted for cooperation with one of said stretching cylinders, a pair of mounting arms (6) for mounting and revolving said press-on roller (10) about a rotational axis (2A') of said one stretching cylinder so that a longitudinal axis (8A) of said press-on roller (10) and said rotational axis (2A') of said one stretching cylinder extend in parallel to each other in any tilted position of said press-on roller and stretching cylinder relative to each other, said pair of mounting arms (6) each having a mounted end rotatably secured for rotation about said rotational axis (2A') of said one stretching cylinder, a first drive (12, 14, 15, 16) for rotating said mounting arms (6) about said rotational axis (2A') to thereby cause said revolving of said press-on roller (10) about said rotational axis (2A') of said one stretching cylinder, and a second drive (11, 18) for causing said press-on roller (10) to move toward and away from said one stretching cylinder.

2. The longitudinal film stretcher of claim 1, comprising an arresting device (29, 30) for limiting said revolving to an angular range of about 80° to about 120° and for locking said mounting arms in a first end position, in a second end position and in any position between said first and second end positions.

3. The longitudinal film stretcher of claim 1, wherein each mounting arm (6) of said pair of mounting arms has a free end (6A) opposite said mounted end, said stretcher further comprising a cross-shaft (8) and first bearings (7) rotatably mounting said cross-shaft (8) to said free ends (6A) of said mounting arms (6), whereby a point on a longitudinal axis of said cross-shaft (8) travels along a line (17) between angular end positions of said mounting arms (6).

4. The longitudinal film stretcher of claim 3, wherein an angle between said angular end positions is within the range of about 80° to about 120°.

5. The longitudinal film stretcher of claim 3, comprising second bearings (10B) for rotatably mounting said press-on roller (10) on said cross-shaft (8) and wherein each of said free ends (6A) of said mounting arms (6) has a longitudinal guide hole (6C) extending radially relative to said rotational axis (2A') of said stretching cylinder (2), said second bearings (10B) being mounted in said longitudinal guide holes (6C), and wherein said second drive comprises a piston cylinder drive (18) mounted for radially positioning said press-on roller (10) relative to said stretching cylinder (2).

6. The longitudinal film stretcher of claim 1, wherein said first drive comprises a gear rim (16) on said mounted end of said mounting arm (6) and a driven pinion (15) rotatably mounted to said machine frame (5) in a position meshing with said gear rim (16) for rotating said mounting arm (6) around said rotational axis (2A') through a limited angular range.

7. The longitudinal film stretcher of claim 6, further comprising a drive shaft (14) rotatably mounted in said machine frame (5), a hand wheel (13) rigidly secured to one end of said drive shaft, said driven pinion being rigidly connected to said drive shaft (14).

8. The longitudinal film stretcher of claim 1, further comprising at least one support bracket (9), wherein each mounting arm (6) of said pair of mounting arms has a free end (6A) opposite said mounted end, said stretcher further comprising a cross-shaft (8) and first bearings (7) rotatably mounting said cross-shaft (8) to said free ends (6A) of said mounting arms (6), said cross-shaft (8) having an extension at each end reaching through a respective one of said first bearings (7), said at least one support bracket (9) being connected to said extension at each end of said cross-shaft (8), a pivot (9D) connecting said second drive (11) to said at least one support bracket (9), and wherein said press-on roller (10) is rotatably secured to said support bracket (9) between said pivot (9D) and said cross-shaft extension, so that said second drive can tilt said press-on roller (10) toward and away from said stretching cylinder (2).

9. The longitudinal film stretcher of claim 8, comprising a tongue and groove connection (9A) between said cross-shaft extension and said at least one support bracket (9) for rigidly connecting said support bracket (9) to said cross-shaft (8).

10. The longitudinal film stretcher of claim 8, comprising an arresting device (29, 30) for limiting said revolving to an angular range of about 80° to about 120° and for locking said mounting arms in a first end position, in a second end position and in any position between said first and second end positions.

* * * * *